United States Patent
Haaf et al.

(10) Patent No.: US 8,515,662 B2
(45) Date of Patent: Aug. 20, 2013

(54) COMPUTER-SUPPORTED MONITORING OF AN ENERGY CONSUMPTION OF A MEANS OF TRANSPORTATION

(75) Inventors: Stefan Haaf, Gaukoenigshofen (DE); Martin Kessner, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 13/322,715

(22) PCT Filed: May 14, 2010

(86) PCT No.: PCT/EP2010/056646
§ 371 (c)(1),
(2), (4) Date: Nov. 28, 2011

(87) PCT Pub. No.: WO2010/136343
PCT Pub. Date: Dec. 2, 2010

(65) Prior Publication Data
US 2012/0072049 A1 Mar. 22, 2012

(30) Foreign Application Priority Data
May 29, 2009 (DE) .......................... 10 2009 023 304

(51) Int. Cl.
*G01C 21/00* (2006.01)
(52) U.S. Cl.
USPC ............ 701/400; 701/408; 701/411; 701/415
(58) Field of Classification Search
USPC .................................. 701/400, 408, 411–415
See application file for complete search history.

(56) References Cited

U.S. PATENT DOCUMENTS

| | | | | |
|---|---|---|---|---|
| 7,783,417 | B2 * | 8/2010 | Vavrus | 701/423 |
| 2002/0107618 | A1 * | 8/2002 | Deguchi et al. | 701/22 |
| 2004/0230376 | A1 * | 11/2004 | Ichikawa et al. | 702/2 |
| 2005/0181246 | A1 * | 8/2005 | Nakaji | 429/13 |
| 2008/0119982 | A1 * | 5/2008 | Yamada | 701/35 |
| 2008/0125958 | A1 * | 5/2008 | Boss et al. | 701/123 |
| 2008/0189033 | A1 * | 8/2008 | Geelen et al. | 701/209 |
| 2008/0221787 | A1 * | 9/2008 | Vavrus | 701/201 |
| 2010/0049397 | A1 * | 2/2010 | Liu et al. | 701/33 |
| 2010/0198508 | A1 * | 8/2010 | Tang | 701/210 |

FOREIGN PATENT DOCUMENTS

| | | |
|---|---|---|
| DE | 102005055243 A1 | 5/2007 |
| WO | 02097377 A1 | 12/2002 |

* cited by examiner

*Primary Examiner* — Hussein A. Elchanti
(74) *Attorney, Agent, or Firm* — Laurence A. Greenberg; Werner H. Stemer; Ralph E. Locher

(57) ABSTRACT

A method and arrangement are configured for determination of the energy consumption of a transportation device per section of the route, in urban traffic, for example. In an embodiment, current energy consumption data is compared to reference data from a fleet of transportation devices. The result is visually conveyed to the driver to allow them an interpretation of the energy consumption and to provide motivation for energy-saving driving behavior. An evaluation of the energy consumption data relative to the route allows specific feedback, for example, that the driver has achieved an energy-saving best value for a section of the route. The gathered data can also be used to pay bonuses or to initiate training measures.

12 Claims, 3 Drawing Sheets

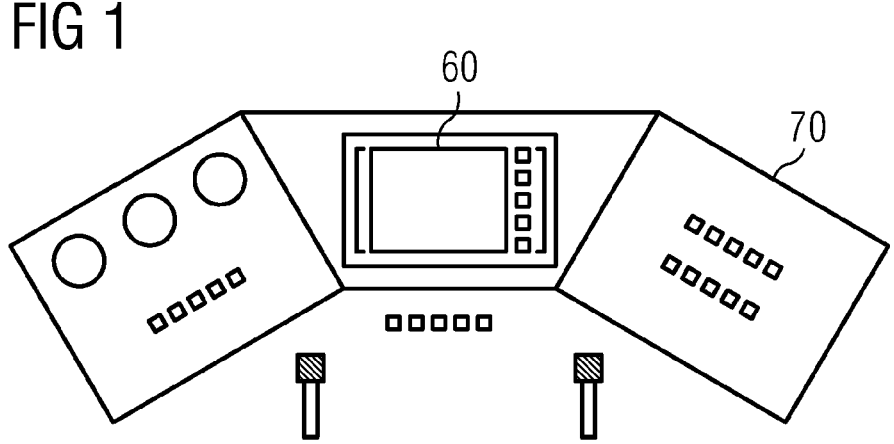
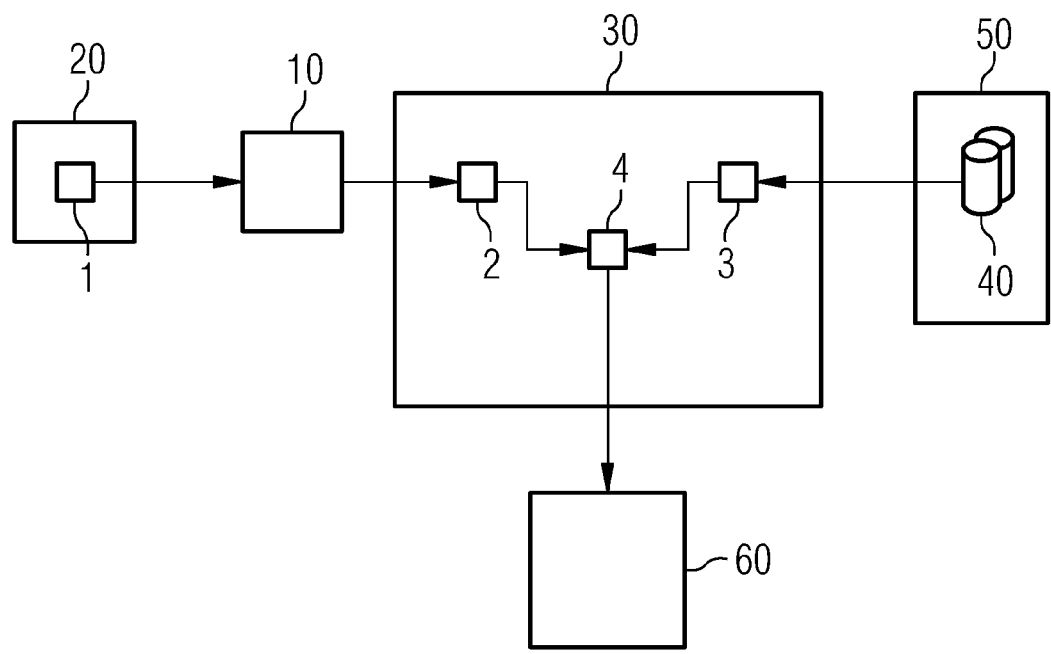

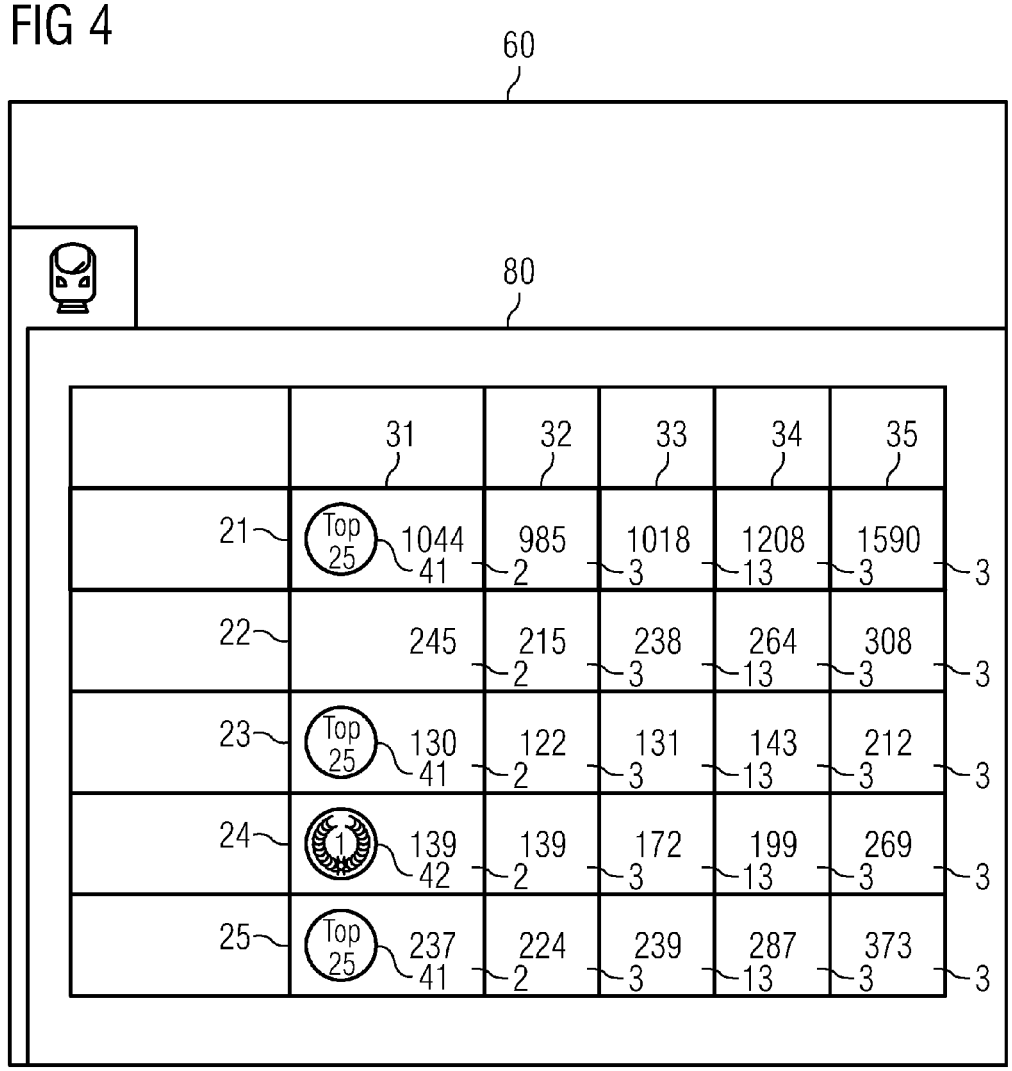

COMPUTER-SUPPORTED MONITORING OF AN ENERGY CONSUMPTION OF A MEANS OF TRANSPORTATION

BACKGROUND OF THE INVENTION

Field of the Invention

The practice of indicating the energy consumption of the means of transportation to a driver is known in a means of transportation such as a rail vehicle or a motor vehicle (e.g. public bus or truck) for example. This is typically done on a screen on the driver's console of the rail vehicle or in the cockpit of the motor vehicle. In such cases, with electrically-driven vehicles, energy consumed, energy recovered and a resulting net energy consumption are usually output. For diesel-powered rail vehicles or for trucks the energy consumption is usually displayed in liters of diesel per 100 km.

BRIEF SUMMARY OF THE INVENTION

The underlying object of the invention is to improve the monitoring of the energy consumption of the means of transportation.

This object is achieved, in the method for computer-supported monitoring of an energy consumption of a means of transportation, by measurement data being received from at least one measuring device which specifies the current energy consumption of the means of transportation. Energy consumption data is subsequently determined from the measurement data which specifies an energy consumption of a means of transportation on a route. Furthermore comparison data, which specifies energy consumption of means of transportation on previous journeys on the route, is retrieved from a database. Finally energy consumption information from a comparison of the energy consumption data with the comparison data is output to a driver of the means of transportation with an output device.

The object is also achieved in the arrangement for computer-supported monitoring of an energy consumption by an interface being provided, which is configured for receiving measurement data from at least one measurement device, with the measurement data specifying a current energy consumption of the means of transportation. The arrangement also has a processing unit which is programmed to determine energy consumption data from the measurement data, with the energy consumption data specifying the energy consumption of the means of transportation on a route. The arrangement also has a data memory that contains a database which contains comparison data which specifies an energy consumption of the means of transportation on previous journeys on the route. The processing unit is programmed to form energy consumption information from a comparison of the energy consumption data with the comparison data. Finally an output means is present which is configured to output the energy consumption information to a driver of the means of transportation.

The method and the arrangement have the advantage that the energy consumption of the means of transportation can be recorded for a prespecified route (for example the route between two stops). This makes it possible to create statistics which allow the driving behavior of the driver of the means of transportation to be analyzed. This is because the driver and his driving behavior have a significant influence on the energy consumption of the means of transportation, since he can decide about acceleration, rolling and braking, or generally about the speed of the means of transportation. A further advantage is that the route-related energy consumption data is transmitted after its recording from the means of transportation to the land side and can be used again there.

The method and the arrangement have the advantage that the output of the energy consumption information supports and motivates an energy-saving driving behavior of the driver. In this way an additional potential for energy saving can be exploited. The vehicle-side output of the energy consumption information makes it possible in this case to set the energy consumption data against the comparison data so as to make it possible for the driver to interpret and analyze the energy consumption data in a sensible manner. The driver is informed rapidly and is simultaneously motivated to drive in an energy-saving way. This promotes energy-saving driver behavior and reduces the energy consumption of the means of transportation.

Further advantageous embodiments of the invention are identified by the features of the subclaims.

Exemplary embodiments of the present invention are explained in greater detail below with reference to figures, in which:

BRIEF DESCRIPTION OF THE SEVERAL VIEWS OF THE DRAWING

FIG. 1 shows a driver's console in a rail vehicle;

FIG. 2 shows an exemplary embodiment of computer-supported monitoring of an energy consumption of a means of transportation;

FIG. 4 shows a display of energy consumption information on a visual output means in accordance with a second variant.

DESCRIPTION OF THE INVENTION

Figure 3:
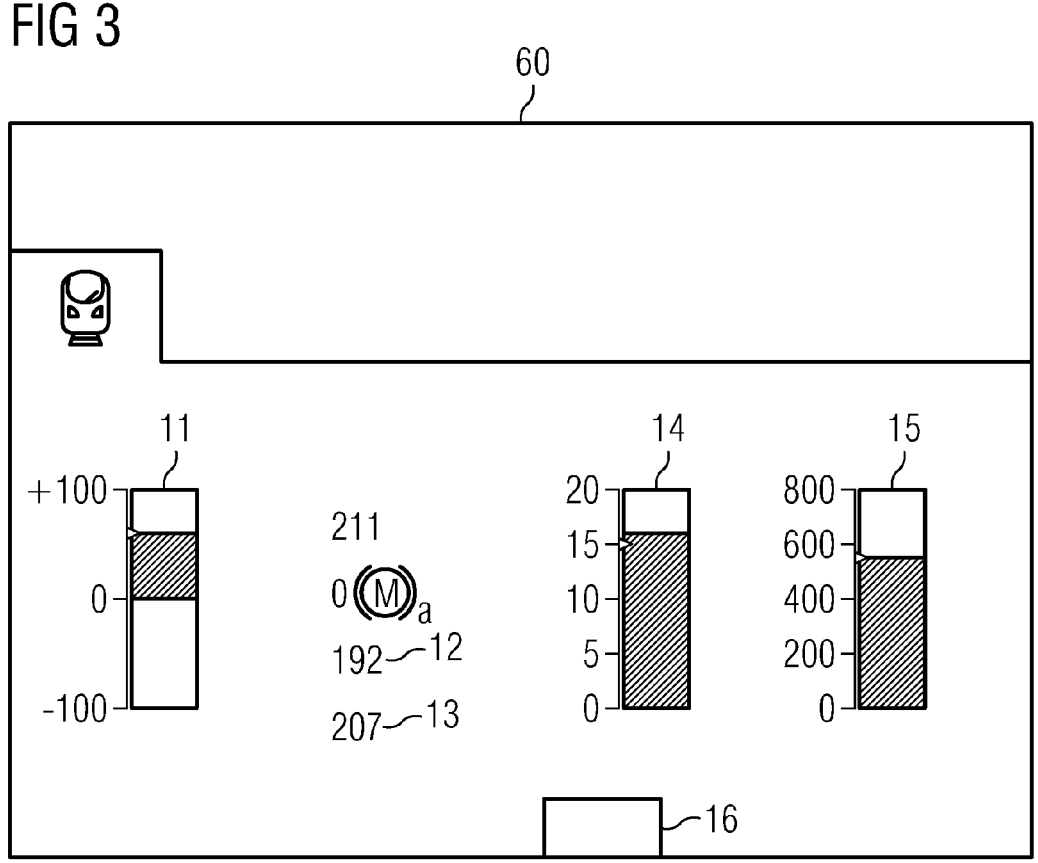
FIG. 3 shows a display of energy consumption information on a visual output means in accordance with a first variant.

FIG. 1 shows a driver's console 70 as is usually to be found in the driver's cab of a rail vehicle. Apart from the rail vehicle, all other means of transportation such as public buses, trucks also aircraft and ships come into consideration. A condition however is that these vehicles repeatedly travel over a pre-specified route. In such cases the same means of transportation does not necessarily have to travel over the route repeatedly, it is sufficient for the route to be covered on a regular basis by similar means of transportation, from a fleet of vehicles, ships or aircraft for example. In the case of a motor vehicle, instead of the driver's console 70 this would involve a driver's cockpit and in the case of an aircraft a pilot's cockpit. A driver of the means of transportation is thus to be understood below as a train driver, vehicle driver, ship's captain or pilot.

In a first exemplary embodiment the routes traveled typically involve routes between stops, such as in local transit by subway trains, rapid transit rail systems, public buses or trains. The routes can also lie between harbors or terminals in ferry traffic or be predetermined as flight routes between airports. Whether the respective means of transportation is transporting people or goods is not of significance here. The degree of loading can however be taken into account, as is explained in greater detail below.

The driver's console 70 contains an output means 60 via which an energy consumption is output to a driver of the means of transportation.

FIG. 2 shows a computer-supported monitoring of an energy consumption of the means of transportation. In this case measurement data 1 is recorded by a measurement device 20. The measurement data 1 in this case typically contains a current consumption of diesel, or for electrically-powered vehicles, energy consumed and energy recovered.

The measurement data 1 is received by a processing unit 30 over an interface 10. The interface 10 involved is a data bus, a cabled network or a wireless network for example.

The processor unit 30 is for example embodied as a processor, circuit board or personal computer. It determines energy consumption data 2 from measurement data 1, which specifies an energy consumption of the means of transportation on a route. It is a good idea in this case to determine a net energy consumption from consumed energy and recovered energy and store it in the energy consumption data 2. The advantage of this lies in the fact that the energy consumption data 2 is determined for the route since this makes possible comparison with previous journeys on the route.

First the position of the means of transportation must be determined in order to detect when the route has been covered and to correctly assign the energy consumption data 2 of the route. Positioning is undertaken for example using GPS, Galileo, a passenger information system, by the driver making entries manually or by balises.

In the event of GPS positioning the start and end points of the routes are available as coordinates. The current position of the means of transportation determined by GPS is then assigned to a start or end point of a route when the means of transportation is stationary. It can also be checked whether the doors are released. Under these conditions it can be assumed that the means of transportation is located at a start or end point of the route. The respective route is now determined in a database of routes on the basis of the current position determined by means of GPS. Whether the means of transportation is located at its start or end point is also recorded.

While the means of transportation is covering the route a mathematical integration is undertaken over the measurement data 1 in order to determine from the continuously measured current energy consumption the overall energy consumption on the route in the form of the energy consumption data 2. For electrical and hybrid drives there may if necessary be a distinction made between consumed and recovered energy in such cases.

After the start point of a route has been detected as the current position of the means of transportation, a new energy consumption data record is created for the energy consumption data 2. This contains the start point of the route, a time of day and an identifier of the driver which is available on the means of transportation as a rule. A further optional field of the energy consumption data record specifies a degree of loading of the means of transportation. This can be determined for example with the aid of a passenger counting system or measured by an air suspension system.

The mathematical integration of the measurement data 1 is reset at the start point of the route. As soon as the end point of the route is detected as the current position of the means of transportation, the energy consumption data record is saved and a new energy consumption data record is created if the end point of the route coincides with the start point of a further route. The energy consumption data 2 is determined from the energy consumption data records. Thus the energy consumption data 2 can contain information such as one or more energy consumption data records or an analysis of said records.

In accordance with a variant of the first exemplary embodiment shown in FIG. 2, comparison data 3, which specifies an energy consumption of means of transportation on previous journeys on the route, is retrieved from a database 40 in a data memory 50. Energy consumption information 4, which is output with an output means 60 to the driver of the means of transportation, is formed from a comparison of the energy consumption data 2 with the comparison data 3.

The database 40 is created beforehand for example by the previously described energy consumption data records or the energy consumption data 2 being recorded during test journeys or in ongoing operation and stored in a database 40. In this way the database 40 can contain for the means of transportation or a fleet of means of transportation a plurality of energy consumption data records for the route or a number of routes—such as all routes between stops in a local transit network.

As well as this the energy consumption data 2 (or the energy consumption data records) can also be recorded during the actual journey in the database 40 so that for future journeys it can be used as comparison data 3 or can be included for forming the comparison data 3 (by means of statistical analysis if necessary).

In addition or as an alternative to the energy consumption data records themselves, the database 40 can contain statistical analyses of the energy consumption data records. The statistical analyses for example contain the best, i.e. lowest value of the energy consumption of the means of transportation for the route, and also the worst, i.e. highest value, an average value (such as the arithmetic mean or the median), a top-ten value (of journeys on the route), a top-25 value (a value of the energy consumption of the twenty five percent of the journeys on the route sorted in accordance with increasing energy consumption), if necessary any other given percentage, an energy consumption per kilometer or an energy consumption converted into grams of $CO_2$ or grams of $CO_2$ per kilometer or other climate-relevant units.

Depending on the design of the method, the energy consumption data records themselves are used as comparison data 3 or the previously described statistical analyses of energy consumption data records are retrieved from the database 40.

Preferably data is retrieved with the comparison data 3 from the database 40 which relates to a specific driver. It is also desirable to explicitly retrieve data with the comparison data 3 which relate to a specific period, such as for example a current year for a best annual value, a current month for a best monthly value, a current week for a best weekly value or a current day for a best daily value. It is also of advantage for the comparison data 3 to contain data which relates to a specific period of a day, for example weekdays between 6:30 and 10:00. The reason for this is that the energy consumption of the means of transportation may correlate with the time of day. Rush hours lead to higher loading and tighter schedules in local transit systems so that at these periods energy-saving driving is not possible to the same extent.

Finally it is desirable for the comparison data 3 from the database 40 to contain data which relates to a comparable loading of the means of transportation. In this case the comparison data 3 must be provided with loading information which, as described above, can be provided as an optional field in the energy consumption data records. As well as this the comparison data should also include the interrogation of any given combinations of criteria, such as a year's best performance of the driver on the route in a rush-hour between 15.30 and 18.30.

Optionally the data memory 50 is arranged on the means of transportation or on the land side. In the latter case the database 40 is thus arranged not on the means of transportation itself but in the data memory 50 on the land side. This offers the advantage that energy consumption data records of the number of means of transportation, such as all vehicles of the fleet, can be transferred to a central location and processed there. The data is transferred for example via data communication or by local reading out of log files on the means of transportation. The processing involves a statistical analysis as described above. The comparison data 3 determined in such cases is transferred back to the means of transportation. The transmission can be undertaken on request, but also periodically in advance. This central processing of the energy consumption data records offers the advantage that the comparison data 3 can also contain aggregated comparison values of a plurality of drivers such as an absolute best value of all drivers on the route for example or an absolute best value of all drivers on the route on weekdays in a rush hour period between 15:30 and 18:30. It is sufficient in such cases to transmit suitable threshold values as comparison data 3. The entire database 40 thus does not have to be transmitted to the means of transportation.

In a next step energy consumption information 4 is formed from a comparison of the energy consumption data 2 with the comparison data 3. This is typically done when the means of transportation reaches the end point of the route.

Subsequently the energy consumption information 4 is output with an output means 60 to a driver of the means of transportation. The output means 60 involves a visual output means such as a screen or an acoustic output means such as a loudspeaker.

FIG. 3 shows the output of the energy consumption information 4 via a screen as the output means 60. Various items of information are displayed, which keep the driver of the means of transportation up-to-date as regards the energy consumption. For this purpose a pulling/braking force 11, a net energy consumption 12, a threshold value 13, a voltage 14 and a current strength 15 are output to the driver. The net energy consumption 12 in this case corresponds to the energy consumption data 2 as described above. The threshold value 13 in this case represents the value of the energy consumption from which 25% of all energy consumption data records with the lowest energy consumption begin. Since the net energy consumption 12 lies below the threshold value 13 in the example shown, the driver in the case shown is among the best 25% of all energy consumption data records for the route section. The voltage 14 and the current strength 15 might relate to the current taken from an overhead line. By selecting a button 16 the driver is given further information, which is shown in FIG. 4.

FIG. 4 once again shows a screen as an output means 60, which this time displays a table 80. Also depicted are a first symbol 41 and a second symbol 42. A first column 31 of the table 80 contains the respective energy consumption data 2 for the driver on his current journey. A second column 32 contains the best value from the comparison data 3 in each case. A third column 33 contains the threshold value 13 already shown in FIG. 3, which is likewise contained in the comparison data 3 and specifies the value from which the most energy-saving 25% of all energy consumption data records begins. A fourth column 34 contains an average value in each case which is contained in the comparison data 3. A fifth column 35 contains the worst value which is contained in the comparison data 3.

A first row 21 in the table 80 contains sum values which are formed over the entire period since the driver began his journey with the means of transportation. A second row 22 contains values for a first route. A third row 23 contains values for a second route, a fourth row 24 values for a third route and a fifth row 25 values for a fourth route. The first symbol 41 shows in the first row 21, the third row 23 and the fifth row 25 that the driver, since the start of the journey, has achieved an energy consumption on the second route and the fourth route which lies within the best 25%. Accordingly the value in the first column 31 is respectively somewhat smaller than the threshold value in the third column 33. The second symbol 42 in the fourth row 24 indicates that the driver has achieved an energy consumption on the third route that represents a best value in relation to the comparison data 3.

As well as the net energy consumption 12 in FIG. 3, information is output to the driver that he has covered the route in an especially energy-saving manner, in that he is notified by means of the first symbol 41 that he is among the best 25%. The second symbol 42 indicates to him that he has achieved a best value. The best value and the best 25% can only be determined by comparison with energy consumption data records of the same driver but also by comparison with energy consumption data records of all other drivers. A screen, which is available in any event on the driver's console of the means of transportation, is preferably used as an output means 60.

In the case depicted in FIG. 4 both numerical and also graphical representations of the energy consumption information 4 are output. The energy consumption information 4, in the case shown in FIG. 4, comprises the entire table 80 with comparison data 3, energy consumption data 2 and the first symbol 41 as well as the second symbol 42. While the energy consumption data 2 and comparison data 3 are output in numerical form, the graphical symbols make it possible to rapidly provide the driver with information and motivate him to drive in an energy-saving manner. A symbol such as a thumbs-up or a sunflower in bloom could be selected as an alternative to the visualization shown. This tells the driver at a glance that he has achieved a new (general or personal) best or that his journey on the route section is among the best 10% or 25% of all journeys. Bad driving performance can also be indicated by the appropriate symbols (e.g. thumbs-down, wilting sunflower). As an alternative to the numerical presentation of the energy consumption data 2 and comparison data 3, this data could also be depicted graphically, as a bar chart for example. The first symbol 41 and the second symbol 42 can be displayed in a context-dependent way when the respective criteria are fulfilled. Instead of the symbols text could also be output.

The energy consumption information 4 can merely involve the first symbol 41 or the second symbol 42. As an alternative or in addition the energy consumption information 4 can also include the comparison data 3 or the energy consumption data 2. In FIG. 4 the energy consumption information 4 with the table 80 comprises all the said components.

The energy consumption information 4 can also appear in the presentation of FIG. 3, perhaps as the first symbol 41 or second symbol 42. This makes it possible for the driver to quickly take note of the energy consumption information 4 without further navigation via the button 16.

In a development, for the best performance, the best 10% and the best 25%, only driving performances are analyzed which do not exceed a timetabled journey time or do not violate other criteria for adherence to a timetable. This ensures that an energy-saving behavior of the driver is not induced at the expense of keeping to the timetable. In this context it is also worthwhile for a suitable symbol or text to indicate that a journey has been excluded from the comparison because of not keeping to the timetable.

The diagrams shown in FIG. 3 and FIG. 4 make it possible for the driver to interpret and analyze the energy consumption meaningfully. Particularly energy-saving behavior is promoted. Suitable graphical symbols have an instructive and motivating effect. The driver is informed when his driving behavior is achieving energy savings and is motivated by positive feedback. The effective result is to train the driver, which makes it possible for him to also drive in an explicitly energy-saving manner in the future. This reduces the overall energy consumption of the means of transport.

The exemplary embodiments described can be implemented in a similar manner for means of transportation such as aircraft, ships, ferries, trucks or public buses. Any external influencing factors such as wind speed or current speeds are to be taken into account in the respective scenario if necessary by the processing unit 30 in the determination of the energy consumption information 4.

In a variant the method is executed iteratively for consecutive routes. Through this variant in FIG. 4 in the table 80 the values in the first line 21 are determined. From the sum of the energy consumption data 2 determined for the consecutive routes overall energy consumption data is formed which specifies an energy consumption of the means of transportation on an overall route which is made up of the consecutive routes. The overall energy consumption data is shown in FIG. 4 in the first row 21 and the first column 31.

The overall route is roughly the sum of all routes since the driver started a shift or started to drive. Information that a new driver has occupied the means of transportation is usually present in the system since the driver must logon before starting the journey. As an alternative this information can be detected from observing further states, such as the opening of the driver's door at specific locations. Forming the sum of the energy consumption data 2 determined for the consecutive routes can optionally be undertaken by the processing unit 30 on the means of transportation or on the land side and then communicated back to the means of transport. For example the net energy consumption on the overall route is then produced from the sum of the net energy consumption on the consecutive routes.

Finally overall comparison data is formed from the sum of the comparison data 3 determined for the consecutive routes, which specifies an energy consumption of means of transportation on previous journeys on the overall route. This overall comparison data is mapped in FIG. 4 in the first row 21 from the second column 32 to the fifth column 35, while the comparison data 3 determined for the consecutive routes lies in the rows below this, (in the present case further routes have been taken into account and summed which are no longer shown).

In a third step, overall energy consumption information formed from a comparison of the overall energy consumption data with the overall comparison data is output with the output means (60) to the driver of the means of transportation. The overall energy consumption information in this case especially involves the first symbol 41 in the first row 21 which shows the driver that on the overall route he is among the best 25% of all energy consumption data records which have been included for comparison.

Basically the processor unit 30 can transfer all recorded energy consumption data 2 to the database 40 in the data memory 50, so that the energy consumption data records of the current journey can also be used in order to further build up the database 40. Furthermore such determination of the energy consumption data 2 on the land side (if the data memory 50 is arranged on the land side) is also suitable for driver-related analysis. This will then be used as a basis for decisions about further measures. For example bad energy consumption data 2 can trigger training measures for energy-saving driving behavior for the driver. Training resources are thus allocated in a targeted manner. In addition the energy consumption data 2 is able to be used as a basis for variable bonus payments so that energy-saving driving behavior is also rewarded financially for the driver.

In accordance with the second exemplary embodiment which is implemented independently or as a supplement to the first exemplary embodiment, assistance data is determined which consists of cooperation data and acceleration data. The cooperation data specifies whether and with what delay the driver has followed instructions of a driver assistance system on the route. The acceleration data specifies the braking and acceleration processes on the route. Furthermore comparison assistance data, which specifies cooperation data or acceleration data from means of transportation on previous journeys on the route, is retrieved from a database. Subsequently assistance information formed from a comparison of the assistance data with the comparison assistance data is output to the driver of the means of transportation.

This enables analysis of whether instructions of a driver assistance system, which gives the driver instructions on energy-saving driving behavior, have been taken into account. For this purpose to data records can be collected in the database 40 and analyzed. This analyzed data is provided as comparison assistance data in the database 40. The analysis of the acceleration data, such as an analysis of the number of braking processes which are followed immediately by acceleration processes, provide information about energy-efficient driving behavior.

All described variants and exemplary embodiments can be freely combined with one another.

The invention claimed is:

1. A method for computer-supported monitoring of an energy consumption of a transportation device, the method which comprises:
   receiving measurement data by least one measurement device, the measurement data specifying a current energy consumption of the transportation device;
   determining energy consumption data from the measurement data with a processing unit, the consumption data specifying an energy consumption of the transportation device on a given route;
   retrieving comparison data from a database, the comparison data specifying an energy consumption of transportation devices on previous journeys on the given route; and
   comparing the energy consumption data with the comparison data to form energy consumption information and outputting the energy consumption information through an output to an operator of the transportation device.

2. The method according to claim 1, which comprises maintaining the database in a data memory on the transportation device.

3. The method according to claim 1, which comprises maintaining the database in a data memory external to the transportation device.

4. The method according to claim 1, wherein the output is a visual output device.

5. The method according to claim 1, wherein the transportation device is a rail vehicle, a public bus, a truck, a ferry, or an aircraft.

6. The method according to claim 1, which comprises comparing the energy consumption data only with comparison data specifying an energy consumption of transport devices
   on previous journeys of the driver;
   on previous journeys during a predetermined period; or
   on previous journeys with a transportation device with the same loading.

7. The method according to claim 1, which comprises carrying out the method iteratively for consecutive routes, and thereby:

forming overall energy consumption data from a sum of the energy consumption data determined for the consecutive routes, which specifies an energy consumption of the transportation device on main overall route which is made up of the consecutive routes;

forming overall comparison data from a sum of the comparison data determined for the consecutive routes, which specifies an energy consumption of transportation devices on previous journeys on the overall route; and outputting overall energy consumption information formed from a comparison of the overall energy consumption data with the overall comparison data to the operator of the transportation device.

8. The method according to claim 1, which comprises:
determining assistance data consisting of
    cooperation data specifying whether or with what delay the operator has followed instructions of an operator assistance system on the route; or
    acceleration data specifying braking and acceleration processes on the route;
acquiring comparison assistance data from the database, the comparison assistance data specifying cooperation data or acceleration data of transportation devices on previous journeys on the route; and
outputting assistance information formed from a comparison of the assistance data with the comparison assistance data via an output device to the operator of the transportation device.

9. The method according to claim 1, which comprises writing the energy consumption data into the database for use as comparison data in future journeys.

10. A computer-readable data carrier having a computer program stored thereon in non-transitory form, the computer program executing the method according to claim 1 when it is loaded into and processed in a processing unit.

11. A computer program stored on a non-transitory computer readable medium and configured for processing in a processing unit and, on processing, executing the method according to claim 1.

12. A system for computer-supported monitoring of an energy consumption of a transportation device, the system comprising:
    an interface configured for receiving measurement data from a least one measurement device, the measurement data specifying a current energy consumption of the transportation device;
    a processing unit programmed for determining energy consumption data from the measurement data, the energy consumption data specifying an energy consumption of the transportation device on a route;
    a data memory containing a database with comparison data specifying an energy consumption of the transportation device on previous journeys on the route;
    said processing unit being programmed to form energy consumption information from a comparison of the energy consumption data with the comparison data; and
    an output device configured for outputting the energy consumption information to an operator of the transportation device.

* * * * *